(12) United States Patent
Slivka

(10) Patent No.: US 6,343,637 B1
(45) Date of Patent: Feb. 5, 2002

(54) PNEUMATIC TIRE WITH BREAKER ASSEMBLY INCLUDING RUBBER/FABRIC WEAR STRIP

(75) Inventor: John Joseph Slivka, Danville, VA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/574,818

(22) Filed: May 19, 2000

Related U.S. Application Data

(62) Division of application No. 09/202,278, filed as application No. PCT/US96/15891 on Oct. 4, 1996, now Pat. No. 6,131,633.

(51) Int. Cl.$^7$ ............... B60C 9/18; B60C 9/20
(52) U.S. Cl. ............... 152/538; 152/526
(58) Field of Search ............... 152/526, 538, 152/531, 533

(56) References Cited

U.S. PATENT DOCUMENTS

| | | |
|---|---|---|
| 1,842,353 A | 1/1932 | Lorentz |
| 2,541,506 A | 2/1951 | Cuthbertson et al. |
| 2,811,998 A | 11/1957 | Bourdon |
| 3,131,744 A | 5/1964 | Boussu et al. |
| 3,261,388 A | 7/1966 | Kovac et al. |
| 3,310,094 A | 3/1967 | Prevost |
| 3,386,487 A | 6/1968 | Massoubre |
| 3,426,825 A | 2/1969 | Leibee |
| 3,513,898 A | 5/1970 | Lugli et al. |
| 3,674,078 A | 7/1972 | Sasaki et al. |
| 3,717,191 A | 2/1973 | Harrington et al. |
| 3,735,790 A | 5/1973 | Bertrand |
| 3,762,458 A | 10/1973 | Yoshida et al. |
| 3,842,885 A | 10/1974 | Alban |
| 3,853,164 A | 12/1974 | Mirtain |
| 3,874,436 A | 4/1975 | Hashida et al. |
| 3,916,968 A | 11/1975 | Masson |
| 3,931,844 A | 1/1976 | Mirtain |
| 3,990,493 A | 11/1976 | Caretta |
| 4,092,196 A * | 5/1978 | Miller et al. ............ 152/526 X |
| 4,687,037 A * | 8/1987 | Pfeiffer et al. .......... 152/538 X |
| 5,111,864 A | 5/1992 | Nakano et al. |

FOREIGN PATENT DOCUMENTS

| | | |
|---|---|---|
| DE | 2046262 | 3/1971 |
| DE | 4032166 | 6/1991 |
| EP | 280674 | 8/1988 |
| FR | 2358998 | 2/1978 |
| GB | 2 171 067 A * | 8/1986 ................ 152/538 |

OTHER PUBLICATIONS

Patent Abstracts of Japan vol. 011, No. 025(M–566), Jan. 23, 1987 & JP 61–196805A (Bridgestone Corp.), Sep. 1, 1986.

* cited by examiner

Primary Examiner—Adrienne C. Johnstone
(74) Attorney, Agent, or Firm—The Goodyear Tire & Rubber Company; Roger D. Emerson; John M. Skeriotis

(57) ABSTRACT

A pneumatic tire 10 for use in aircraft landing applications is provided. The tire includes a breaker assembly 20, 20A, 20B having circumferentially extending layers of cord fabric and wear strips to enhance performance. In one embodiment, the wear strips are rubber and are provided as central portions 26, 44 of breaker layers 24, 40 with cord fabric extensions 30, 48 on either side. In a second embodiment, the wear strips are thin, narrow rubber strips 72 imposed between adjacent cord fabric breaker layers 56, 60, 64, 68. In a third embodiment, the wear strips are narrow cord fabric strips 92 imposed between adjacent cord fabric layers 80, 84, 88.

3 Claims, 3 Drawing Sheets

PNEUMATIC TIRE WITH BREAKER ASSEMBLY INCLUDING RUBBER/FABRIC WEAR STRIP

This application is a division of application Ser. No. 09/202,278, filed as PCT/US 96/15891 on Oct. 4, 1996, Nov. 30, 1998, now U.S. Pat. No. 6,131,633.

TECHNICAL FIELD

This intention pertains to the art of pneumatic tires, and more specifically to tires of the type having a breaker assembly comprising layers of cord fabric positioned beneath the tread. The breaker assembly includes wear strips to reduce wear in the crown region of the tire.

BACKGROUND ART

Pneumatic tires which are used in aircraft landing applications tend to wear along the centerline faster than the shoulder regions. When the tire wears through the breaker assembly, it must be removed and replaced.

In the art, various breaker assembly constructions have been set forth for use in pneumatic tires in efforts to enhance certain features of the tire. For example, U.S. Pat. No. 3,717,191 to Harrington et al. discloses a strip of rubber compound interposed between adjacent layers of cord fabric in a breaker assembly in order to change the stiffness of the tread between the crown and shoulder regions.

The arrangement of the bias angle of cords within a breaker ply with respect to the bias angle of cords within an additional breaker ply, as disclosed in U.S. Pat. No. 3,131,744 to Boussu et al., seeks to improve the roadability and riding comfort of a pneumatic tire.

In U.S. Pat. No. 3,762,458 to Yoshida et al., a pneumatic tire having a breaker layer of rubber coated glass cords sandwiched between two layers of short cut fiber reinforced rubber is disclosed. The pneumatic tire purportedly has improved abrasion resistance, cornering power and plunger resistance.

DISCLOSURE OF INVENTION

The present invention is directed to a pneumatic tire having an improved breaker assembly in order to resist wear in the crown region of the tire. The tire is particularly useful in aircraft applications in order to increase the number of landings the tire can achieve before replacement is necessary.

Generally, the pneumatic tire 10 includes a pair of beads (not shown), a carcass 18 extending from one bead to the other through a crown region of the tire, a tread 14 covering the outer side of the carcass 18, and a breaker assembly 20, 20A, 20B disposed between the tread 14 and the carcass 18 in the crown region of the tire. The breaker assembly 20, 20A, 20B includes wear strips. The construction of the wear strips and placement in the breaker assembly are set forth in the following preferred embodiments.

In one embodiment, the breaker assembly 20 comprises a first circrumferentially extending breaker layer 24 which includes a central portion 26 located between a pair of extensions 30. Preferably, the central portion 26 comprises rubber material and the extensions 30 comprise cord fabric. The central portion 26 acts as a wear strip to improve performance of the tire in aircraft landing applications.

A second circumferentially extending breaker layer 34 is positioned radially inwardly of the first layer 24. In a preferred embodiment, the second layer 34 is formed of cord fabric.

A third circumferentially extending breaker layer 40, located radially inwardly of the second layer 34, also includes a central portion 44 between a pair of extensions 48. The construction of the third layer 40 is similar to that of the first layer 24 in that the central portion 44 comprises rubber while the extensions 48 comprise cord fabric.

A fourth circumferentially extending breaker layer 52 is located radially inwardly of the third layer 40. The construction of the fourth layer 52 is similar to that of the second layer 34 and comprises cord fabric.

Another embodiment of the present invention includes at least three, and preferably four, circumferentially extending breaker layers 56, 60, 64, 68 comprising cord fabric. Interposed between adjacent layers in the central region of the breaker assembly 20A are narrow, relatively thin strips 72 of rubber.

In yet another embodiment, first, second, and third circumferentially extending breaker layers 80, 84, 88 comprises cord fabric. Interposed between adjacent layers in the central region of the breaker assembly 20B are circumferentially extending strips of cord fabric having a transverse width substantially less than that of the adjacent breaker layers such as narrow wear strips 92 of cord fabric whose transverse widths are essentially equal.

Definitions

For ease of understanding this disclosure the following terms are disclosed:

"Axial" and "axially" means the lines or directions that are parallel to the axis of rotation of the tire.

"Circumferential" means lines or directions extending along the perimeter of the surface of the annular tire parallel to the equatorial plane EP and perpendicular to the axial direction.

"Equatorial Plane (EP)" means the plane perpendicular to the tire's axis of rotation and passing through the center of its tread.

"Inner" means toward the inside of the tire and "outer" means toward its exterior.

"Radial" and "radially" mean directions radially toward or away from the axis of rotation of the tire.

"Rubber" means both natural and synthetic rubber compounds or a combination thereof.

DETAILED DESCRIPTION OF THE INVENTION

Figure 1:
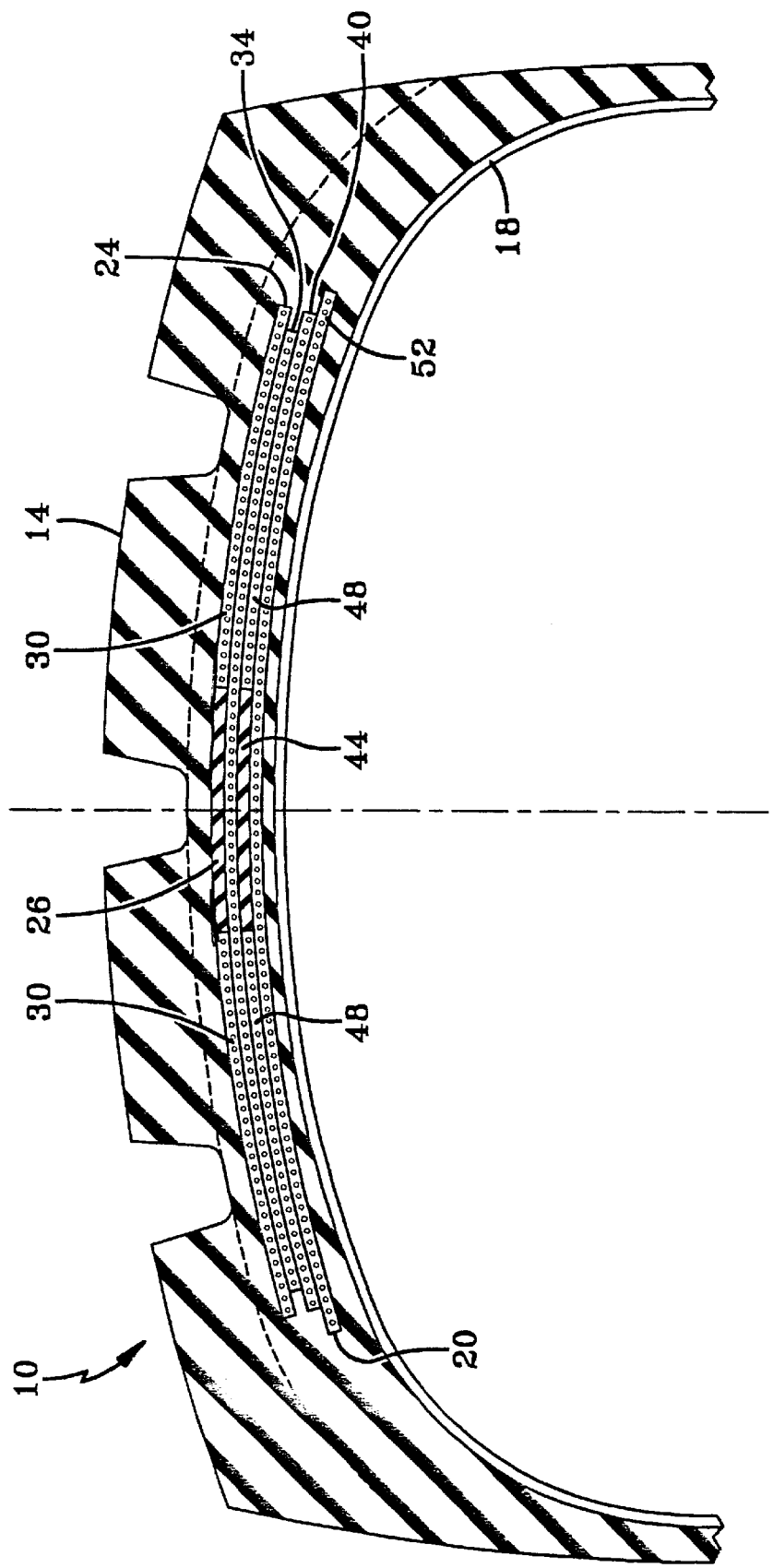
FIG. 1 is a sectional view of one embodiment of the present invention.

FIG. 1 shows a partial sectional view of a pneumatic tire 10 of the present invention. Disposed between the tread 14 and the carcass 18 is a breaker assembly 20. The present invention is particularly directed to the construction of breaker assembly 20.

In the embodiment shown in FIG. 1, the breaker assembly 20 comprises a first circumferentially extending breaker layer 24 which includes a central portion 26 located between a pair of extensions 30. Preferably, the central portion 26 comprises rubber material and the extensions 30 comprise cord fabric.

In a preferred embodiment, the central portion 26 has a transverse width which is between 10%–50% of the transverse width of the entire first layer 24. Also, in a preferred embodiment, the thickness of the first layer 24 is essentially constant across its entire width. In other words, the thickness of the central portion 26 is essentially equivalent to the thickness of the cord fabric extensions 30. The central portion 26 acts as a wear strip to improve performance of the tire in aircraft landing applications.

A second circumferentially extending breaker layer 34 is positioned radially inwardly of the first layer 24. In a preferred embodiment, the second layer 34 is formed of cord fabric. As shown in FIG. 1, in a preferred embodiment, the transverse width of the second layer 34 is generally less than the transverse width of the first layer 24.

A third circumferentially extending breaker layer 40, located radially inwardly of the second layer 34, also includes a central portion 44 between a pair of extensions 48. The construction of the third layer 40 is similar to the first layer 24 in that the central portion 44 comprises rubber while the extensions 48 comprise cord fabric. In one embodiment of the invention, the central portions 26, 44 are essentially equal in transverse width. However, differences in width might be preferred in some applications and fall within the scope of the present invention. Likewise, the transverse width of the entire third layer 40 may differ from the transverse width of the entire first layer 24 according to the application of the invention.

A fourth circumferentially extending breaker layer 52 is located radially inwardly of the third layer 40. The construction of the fourth layer 52 is similar to that of the second layer 34 and comprises cord fabric.

Figure 2:
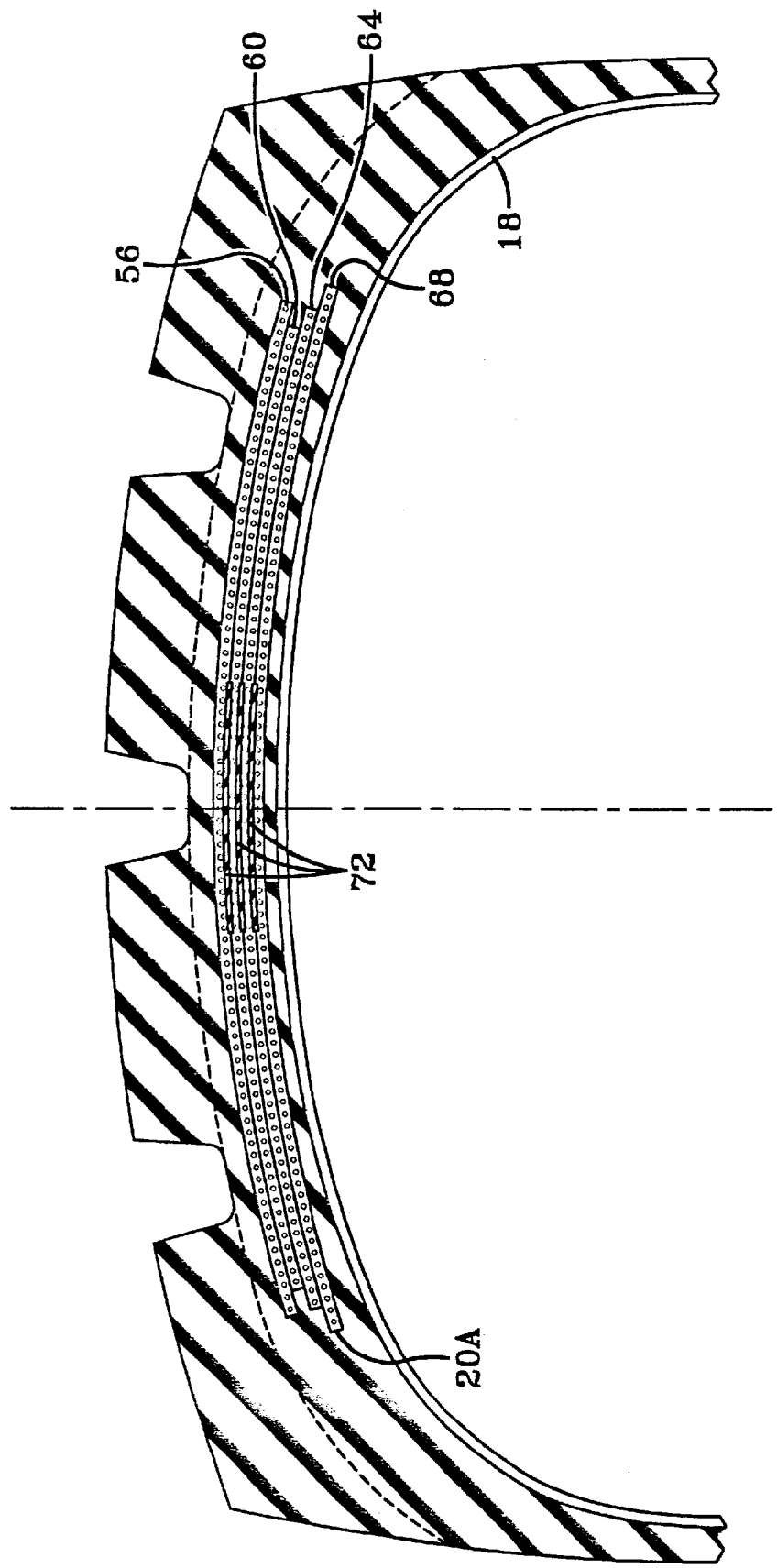
FIG. 2 is a sectional view of another embodiment of the present invention.

Another embodiment of the present invention, as shown in FIG. 2, includes at least three, and preferably four, circumferentially extending breaker layers 56, 60, 64, 68 comprising cord fabric. Interposed between adjacent layers in the central region of the breaker assembly 20A are narrow, relatively thin strips 72 of rubber. In a preferred embodiment, the thickness of the rubber strips 72 is between 0.33 and 0.50 times the thickness of one of the cord fabric layers. The transverse widths of each of the strips 72 is preferably between 10% and 50% of one of the cord fabric layers. In this embodiment, the rubber strips 72 act as wear strips to improve the tire's performance.

Figure 3:
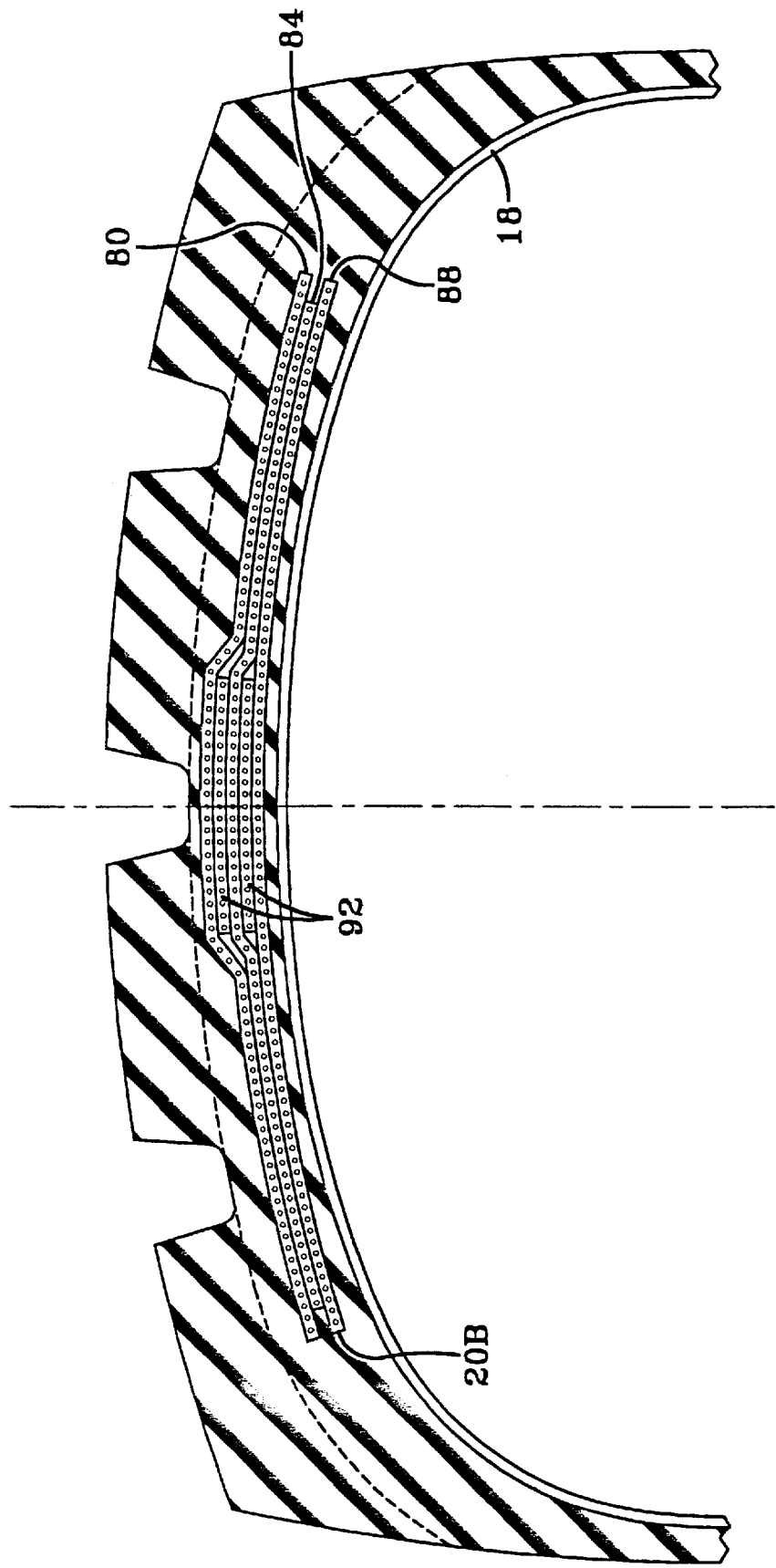
FIG. 3 is a sectional view of yet another embodiment of the present invention.

In the embodiment shown in FIG. 3, first, second, and third circumferentially extending breaker layers 80, 84, 88 comprise cord fabric. Interposed between adjacent layers in the central region of the breaker assembly 20B are narrow wear strips 92 of cord fabric. The transverse widths of the fabric strips 92 is essentially the same as the thickness of one of the breaker layers.

What is claimed is:

1. A pneumatic tire for vehicle wheels having a pair of beads, a carcass extending from one bead to the other through a crown, a tread covering the outer side of the carcass, and a breaker assembly arranged in the crown and on the outside of the carcass and on the inside of the tread, the breaker assembly comprising at least first, second, and third circumferentially extending layers, the pneumatic tire being characterized by:

a first circumferentially extending strip of cord fabric interposed between the first and second breaker layers, the first strip having a transverse width substantially less than that of the first and second breaker layers; and, a second circumferentially extending strip of cord fabric interposed between the second and third breaker layers, the second strip having a transverse width substantially less than that of the second and third breaker layers, the first and second strips being positioned in a center region of the breaker assembly and having transverse widths between 10%–50% of the transverse width of one of the breaker layers.

2. The pneumatic tire of claim 1 wherein the transverse widths of the first and second strips are essentially equal.

3. The pneumatic tire of claim 1 wherein a thickness of the first strip is essentially equal to a thickness of the first breaker layer.

* * * * *